United States Patent
Fukuda

(10) Patent No.: US 6,834,876 B2
(45) Date of Patent: Dec. 28, 2004

(54) METHOD AND APPARATUS FOR CONTROLLING A BICYCLE TRANSMISSION WITH COMBINED SHIFT COMMANDS

(75) Inventor: Masahiko Fukuda, Amagasaki (JP)

(73) Assignee: Shimano, Inc., Osaka ( * ) Notice: Subject to any disclaimer, the term of this patent is extended or adjusted under 35 U.S.C. 154(b) by 0 days.

(21) Appl. No.: 10/368,990

(22) Filed: Feb. 18, 2003

(65) Prior Publication Data

US 2003/0160420 A1 Aug. 28, 2003

(30) Foreign Application Priority Data

Feb. 21, 2002 (JP) ........................................ 2002-044467

(51) Int. Cl.[7] ................................................ B62M 1/02
(52) U.S. Cl. ............................. 280/261; 701/52; 474/70
(58) Field of Search ................................. 280/260, 261; 474/70; 701/51, 52, 64, 66

(56) References Cited

U.S. PATENT DOCUMENTS

| | | | | |
|---|---|---|---|---|
| 5,261,858 A | * | 11/1993 | Browning | 474/69 |
| 5,728,017 A | * | 3/1998 | Bellio et al. | 474/70 |
| 6,073,061 A | * | 6/2000 | Kimura | 701/1 |
| 6,146,297 A | * | 11/2000 | Kimura | 474/78 |
| 6,367,833 B1 | * | 4/2002 | Horiuchi | 280/260 |
| 2001/0048211 A1 | * | 12/2001 | Campagnolo | 280/261 |
| 2003/0078716 A1 | * | 4/2003 | Takeda | 701/51 |

FOREIGN PATENT DOCUMENTS

JP    10-159964    6/1998

* cited by examiner

Primary Examiner—Daniel G. DePumpo
(74) Attorney, Agent, or Firm—James A. Deland

(57) ABSTRACT

A gear shift control apparatus comprises a shift command input that receives shift commands indicating a desired gear shift operation, a control output that outputs controls signals that control a gear shift unit to shift the bicycle transmission, a gear shift monitor that monitors a progress of a gear shift operation by the gear shift unit, and a gear shift controller operatively coupled to the shift command input, to the control output, and to the gear shift monitor. The gear shift controller receives a shift command and outputs a control signal that controls the operation of the gear shift unit to shift the bicycle transmission to a target gear. The gear shift controller modifies the control signal when the gear shift controller receives a second shift command corresponding to a second target gear that differs from a first target gear corresponding to a first shift command and the gear shift operation initiated by the first shift command has not completed.

10 Claims, 14 Drawing Sheets

METHOD AND APPARATUS FOR CONTROLLING A BICYCLE TRANSMISSION WITH COMBINED SHIFT COMMANDS

BACKGROUND OF THE INVENTION

The present invention is directed to bicycles and, more particularly, to various features of an apparatus for controlling a bicycle transmission.

In recent years, some bicycle transmissions have been controlled by devices that operate via electric power or pneumatic power. Such transmissions may be shifted automatically according to the bicycle speed or manually by the rider. Typically, a shift command is generated according to the bicycle speed obtained by a speed sensor or according to manual input by the rider, the shift command is processed by a gear shift controller, and the appropriate gear of the transmission is set by a gear shift unit.

Shift commands sometimes are generated while the gear shift unit is being operated, either manually by the rider or automatically when the bicycle speed changes quickly. When prior art systems receive shift commands at this time, either the shift commands are ignored by the gear shift controller, or else the shift commands are saved and executed sequentially by the gear shift controller after the current gear shift operation has completed. If shift commands are ignored in the case of manual shifting, then the rider's intentions are not carried out. Furthermore, in such a system the rider must personally keep track of the timing when shifting operations begin and end before he or she can repeat the desired shift command, which makes the shifting operation more complicated. On the other hand, when the shift commands are saved and executed sequentially after the pending gear shift operation has completed, there is a risk of wasted effort. Generally, there is not much difficulty if the series of shift commands correspond to all upshift commands or all downshift commands. However, sometimes the rider enters a mixed series of upshift and downshift commands, either because of changing conditions or because of initial misjudgment of the desired gear. If, for example, the rider wanted to enter a single upshift command but mistakenly entered two upshift commands and then entered a downshift command to correct the error, then in prior art systems the transmission would make a total of three shifts instead of one (two upshift operations and then one downshift operation to achieve the desired gear). Such a mode of operation creates unnecessary wear on the components, it requires more time to execute all of the shift commands, and it unnecessarily drains the power supply.

One possible method to alleviate some of the foregoing problems is to calculate the target gear that would result if all of the shift commands were executed sequentially, and then shift to the resulting target gear after the pending gear shift operation has completed. However, waiting until the pending gear shift operation has completed may cause the new gear shift operation (which is the result of multiple shift commands) to be executed in a rough manner.

SUMMARY OF THE INVENTION

The present invention is directed to inventive features of an apparatus for controlling a bicycle transmission. In one embodiment of the present invention, a gear shift control apparatus comprises a shift command input that receives shift commands indicating a desired gear shift operation, a control output that outputs control signals that control a gear shift unit to shift the bicycle transmission, a gear shift monitor that monitors a progress of a gear shift operation by the gear shift unit, and a gear shift controller operatively coupled to the shift command input, to the control output, and to the gear shift monitor. The gear shift controller receives a shift command and outputs a control signal that controls the operation of the gear shift unit to shift the bicycle transmission to a target gear. The gear shift controller modifies the control signal when the gear shift controller receives a second shift command corresponding to a second target gear that differs from a first target gear corresponding to a first shift command and the gear shift operation initiated by the first shift command has not completed. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
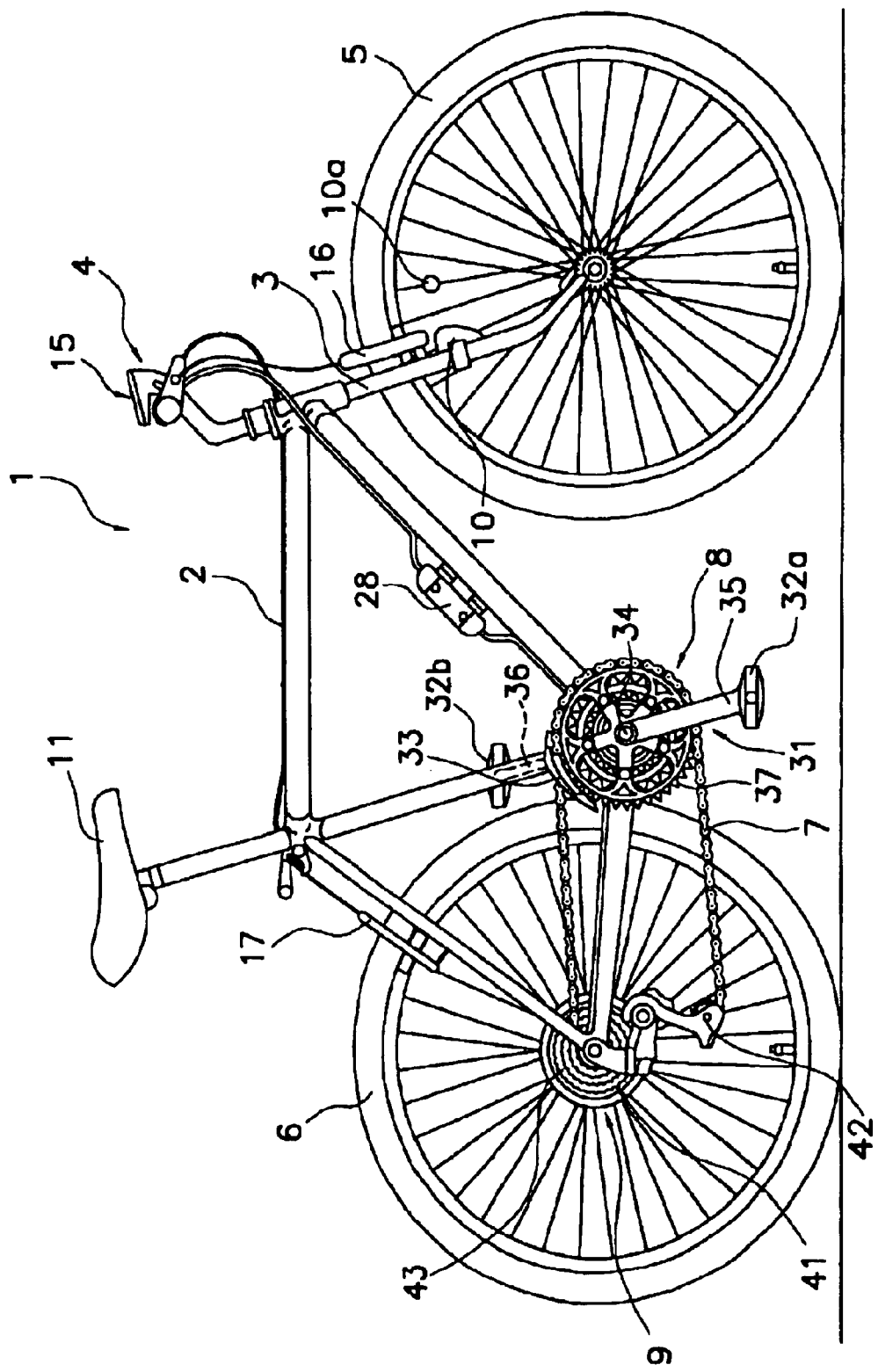
FIG. 1 is a side view of a bicycle that includes a particular embodiment of an electrically controlled bicycle transmission.
Figure 2:
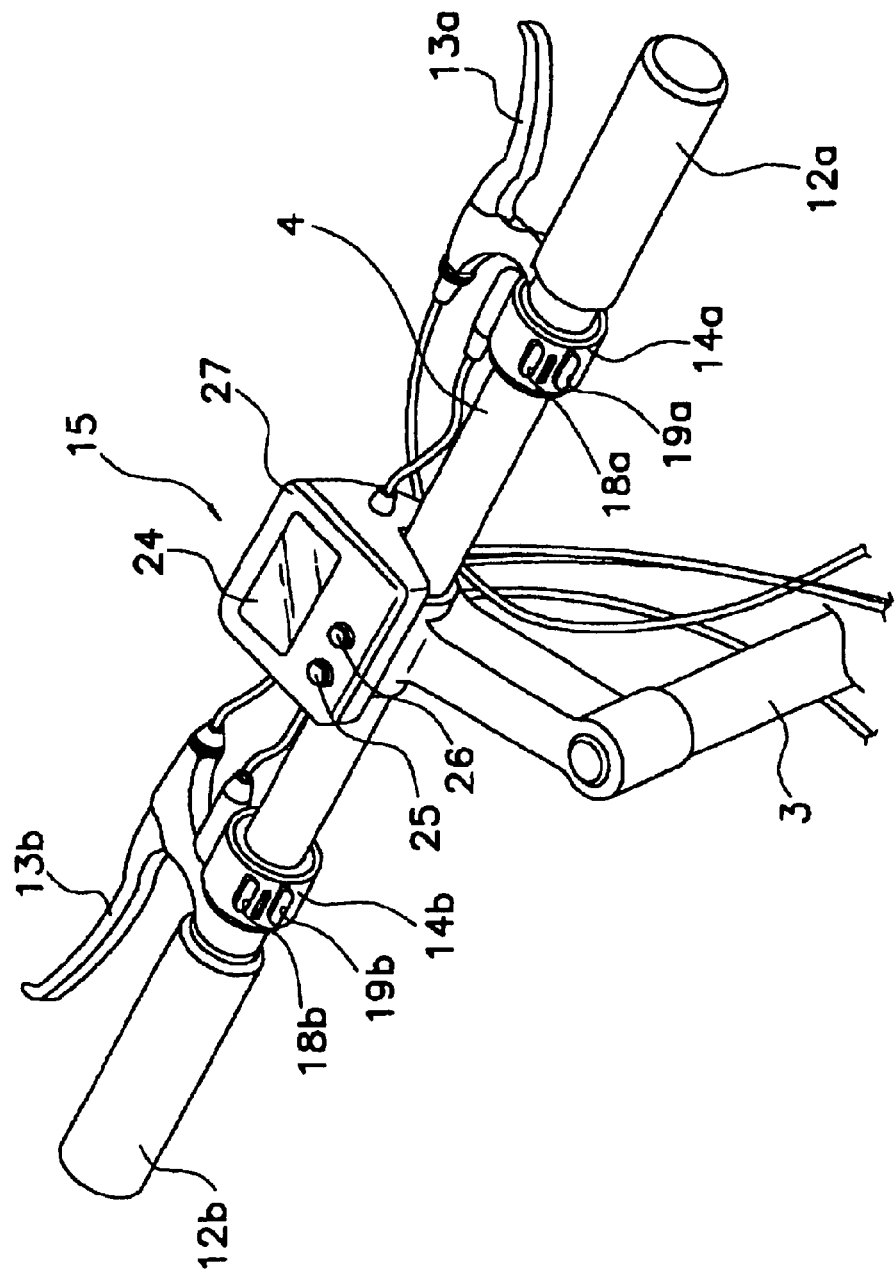
FIG. 2 is a detailed view of particular embodiments of handlebar mounted components of the bicycle shown in FIG. 1.

FIG. 1 is a side view of a bicycle that includes a particular embodiment of an electrically controlled bicycle transmission. The bicycle 1 is a sport bicycle of a mountain bike type, and it comprises a frame 2, a front fork 3 rotatably mounted to frame 2 in slanted manner, a handlebar assembly 4 mounted to the upper part of fork 3, a front wheel 5 rotatably attached to the lower part of fork 3, a rear wheel 6 rotatably attached to the rear of frame 2, a chain 7, a front external gear transmission 8, a rear external gear transmission 9, and a saddle 11 on which the rider sits. A front wheel brake 16 is provided for braking the front wheel 5, and a rear wheel brake 17 is provided for braking the rear wheel 6. As shown in FIG. 2, respective grips 12a, 12b and brake levers 13a, 13b are provided on both ends of handlebar assembly 4. Brake lever 13b is connected to the front wheel brake 16 for braking front wheel 5, and brake lever 13a is connected to the rear wheel brake 17 for braking rear wheel 6.

The front external gear transmission 8 is a mechanical unit attached in the central lower part of frame 2 for transmitting the drive force generated by the rider to the rear external gear transmission 9 via the chain 7. In this embodiment, the front external gear transmission 8 comprises three sprockets 37 of various sizes, and a front derailleur 33. The three sprockets 37 are installed on a gear crank 31 that is rotated when the rider pushes pedals 32a and 32b. The gear crank 31 comprises a crankshaft 34 that passes horizontally and rotatably through the central lower part of frame 2, a right crank 35, and a left crank 36. One end of the right crank 35 is nonrotatably connected to the right side of crankshaft 34, and the three sprockets 37 are nonrotatably attached to the right crank 35. One end of the left crank 36 is nonrotatably connected to the left side of crankshaft 34. The other ends of right crank 35 and left crank 36 rotatably support pedals 32a and 32b, respectively. The front derailleur 33 engages the chain 7 with one of the three sprockets 37 and can be moved by a gear shift unit in the form of a motor, solenoid, or some other actuator (not shown in the figures) that is controlled by a gear shift controller 15 described below. A front derailleur position sensor (not shown in the figures) detects the position of front derailleur 33, and hence the current gear of front transmission 8.

The rear external gear transmission 9 serves to transmit the driving force transmitted by the chain 7 to the rear wheel 6. The rear external gear transmission 9 comprises a rear sprocket wheel 41 and a rear derailleur 42. In this embodiment, rear sprocket wheel 41 comprises seven sprockets 43 of different sizes that are mounted concentrically with the hub portion of rear wheel 6. Rear derailleur 42 engages chain 7 with one of the seven sprockets 43 and can be moved by a gear shift unit in the form of a motor, solenoid, or some other actuator (not shown in the figures) that is controlled by gear shift controller 15. A rear derailleur position sensor (not shown in the figures) detects the position of rear derailleur 42 and hence the current gear of rear external gear transmission 9. The rear derailleur position sensor provides position signals SH that are used in a manner described below.

As shown in FIG. 2, shift command units 14a, 14b are provided inwardly of grips 12a, 12b and brake levers 13a, 13b, respectively. Gear shift controller 15 is attached to the central portion of handlebar assembly 4, and it is operatively connected to the shift command units 14a, 14b. The shift command units 14a, 14b are used for manually shifting the front external gear transmission 8 and rear external gear transmission 9. A front upshift button 18a and a front downshift button 19a are provided in the shift command unit 14a, and a rear upshift button 18b and a rear downshift button 19b are provided in the shift command unit 14b. In this embodiment, the upshift buttons 18a and 18b provide signals for upshifting the front and rear external gear transmissions 8 and 9 by one speed step. Similarly, the downshift buttons 19a and 19b provide signals for downshifting the front and rear external gear transmissions 8 and 9 by one speed step. This arrangement facilitates shift command computation and facilitates operation by the rider.

Figure 3:
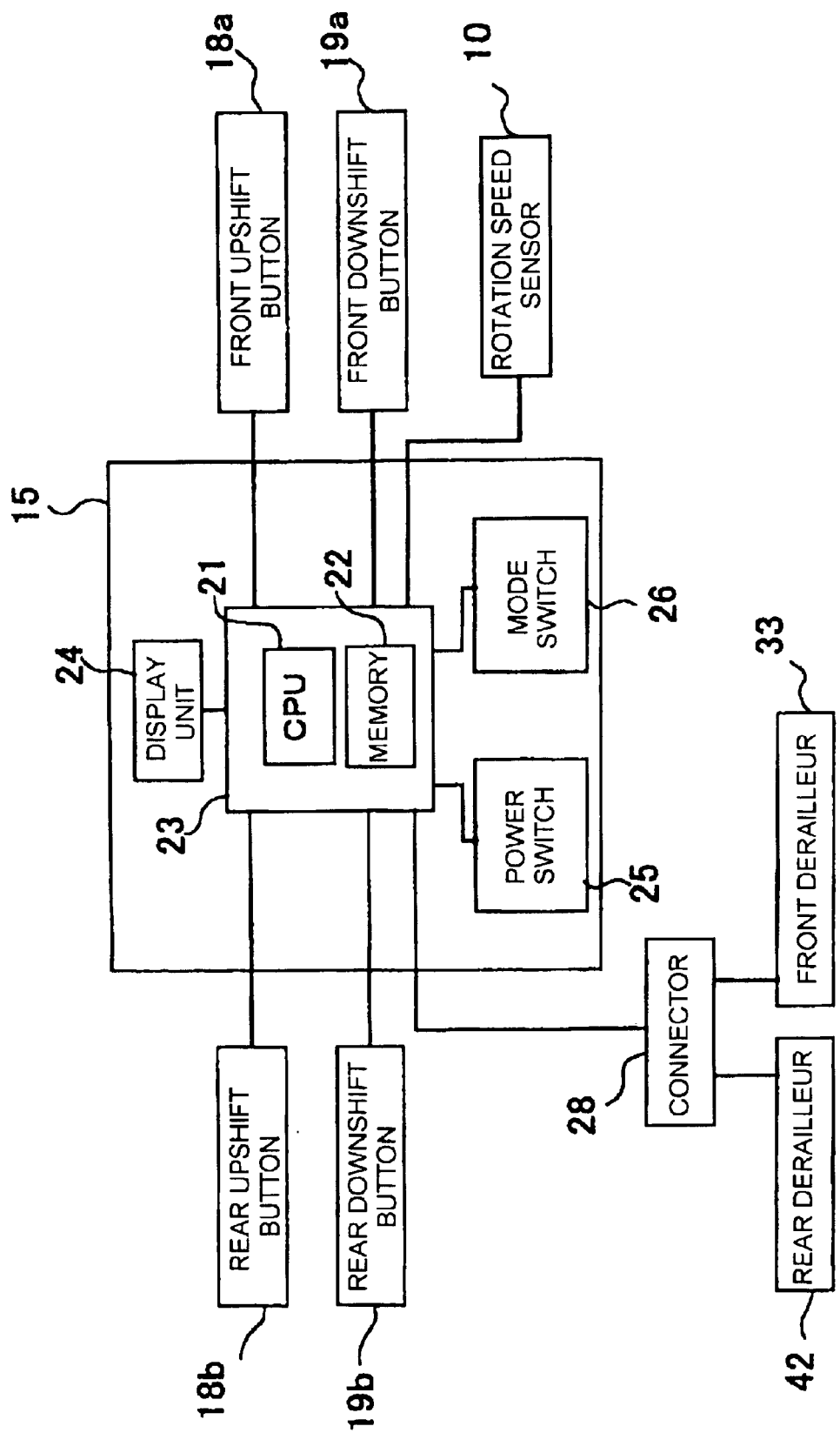
FIG. 3 is a block diagram of a particular embodiment of electrical components used with the electrically controlled bicycle transmission.

As shown in FIG. 3, the gear shift controller 15 includes a controller 23 comprising a CPU 21 and a memory 22, a display unit 24 that displays the current active gear and other information, a power switch 25 and a mode switch 26. The controller 23 is programmed to perform gear shift control and display control via the CPU 21. The upshift and downshift buttons 18a, 18b, 19a and 19b, and a rotation speed sensor 10, are connected to the controller 23. Gear shift controller 15 is connected to the gear shift units for front derailleur 33 and rear derailleur 42 via a connector 28, and it performs gear shift control for both mechanisms. In the case of manual gear shift mode, such control is executed in response to the manual operation of shift command units 14a and 14b. In the case of automatic gear shift mode, such control is executed in response to gear shift signals generated in response to speed signals from a rotation speed sensor 10. The display unit 24 comprises a liquid crystal display device that uses the segment method, for example, and can display the current bicycle speed, the total distance traveled, the current gear, and so on. The power switch 25 turns the display unit 24 ON and OFF. The mode switch 26 changes the mode between automatic gear shift mode and manual gear shift mode. In addition, the gear shift controller 15 is disposed in a box-shaped control case 27, and the display unit 24, the power switch 25, and the mode switch 26 are disposed on the top surface thereof.

Figure 4:
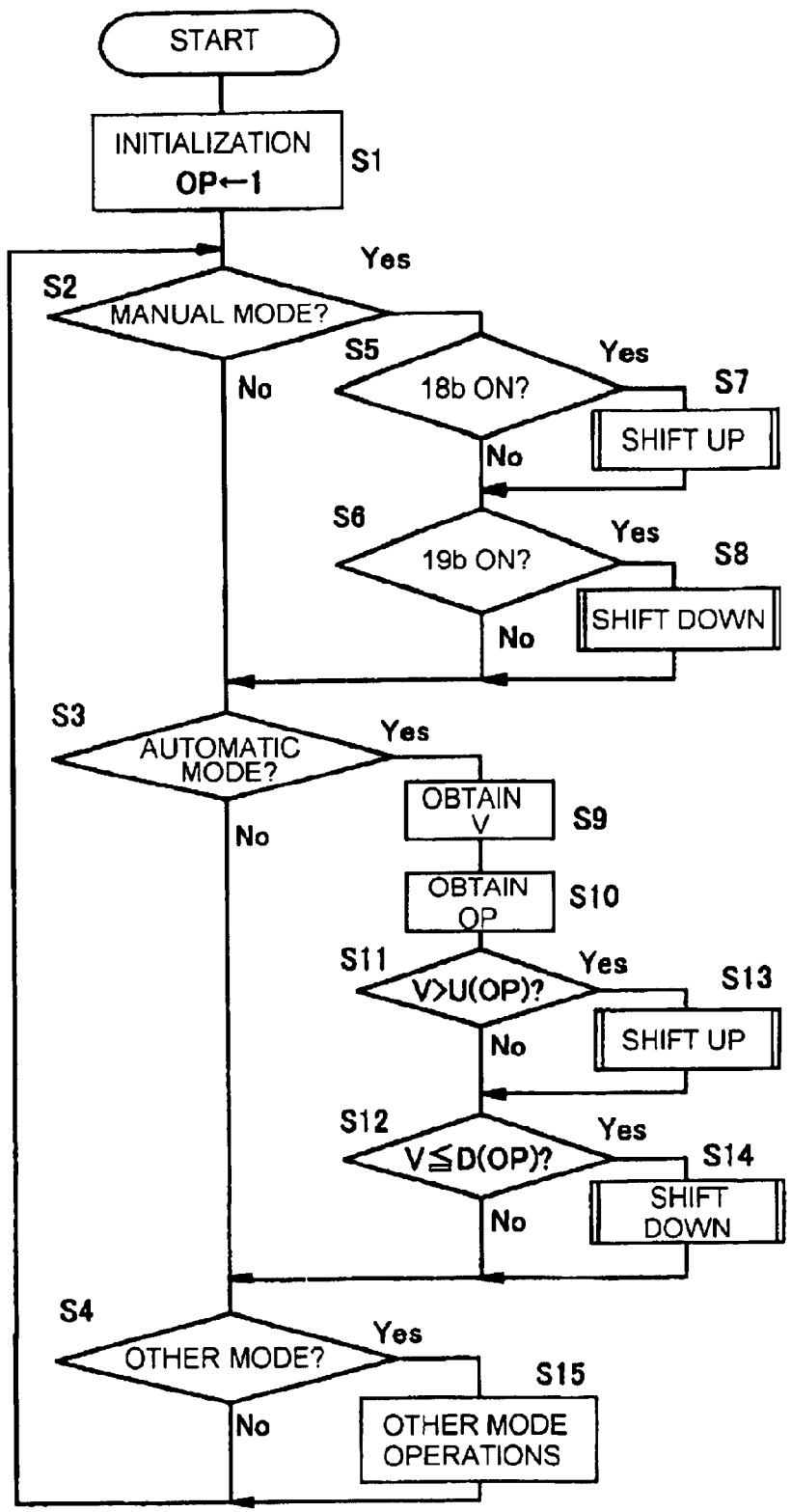
FIG. 4 is a flow chart of a particular embodiment of a main routine used to control the bicycle transmission.
Figure 5:
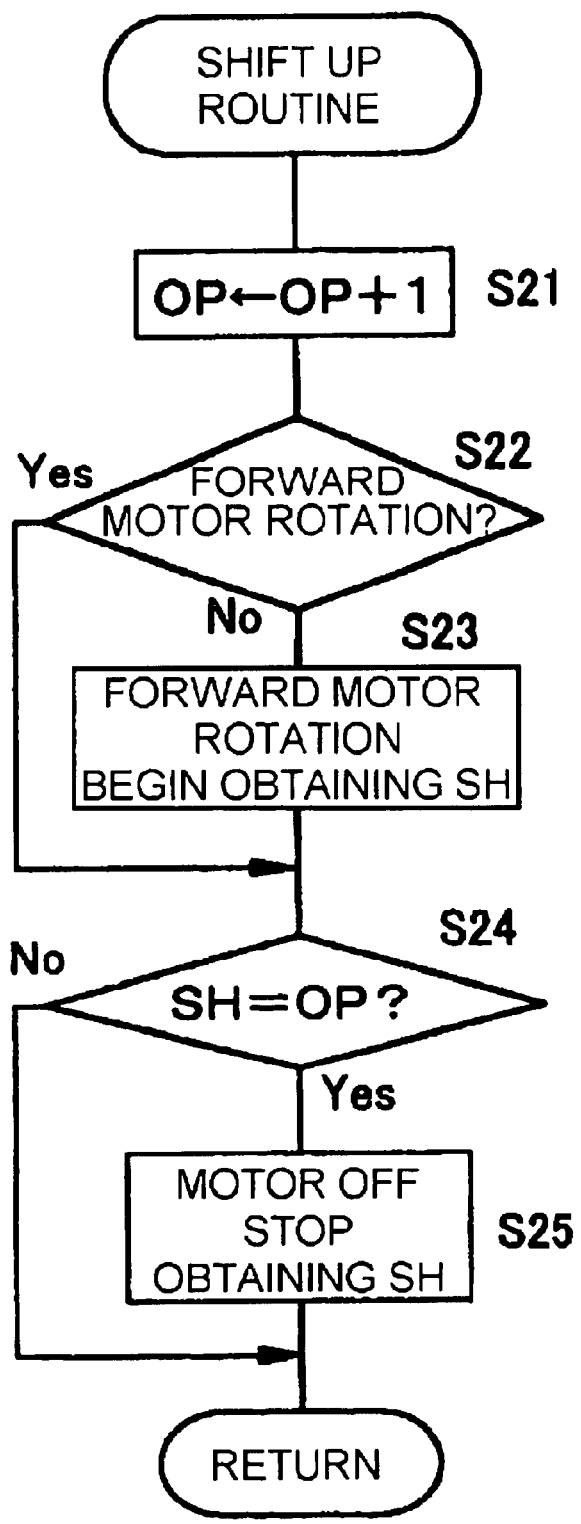
FIG. 5 is a flow chart of a particular embodiment of an upshift routine used to upshift the bicycle transmission.
Figure 6:
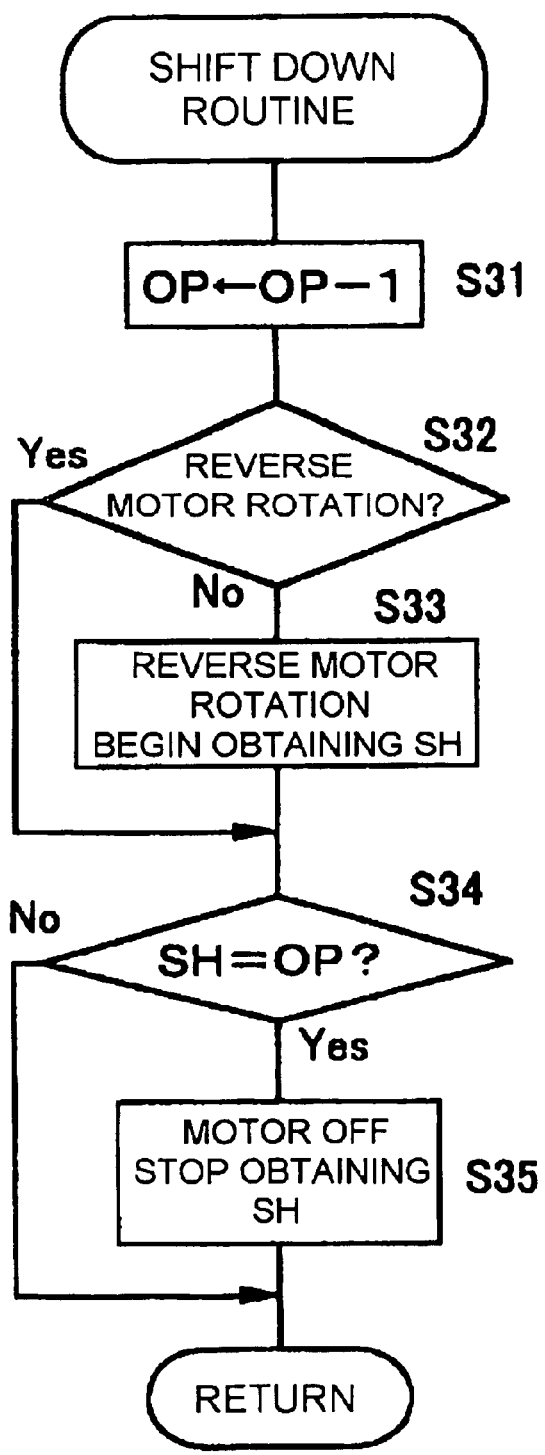
FIG. 6 is a flow chart of a particular embodiment of a downshift routine used to downshift the bicycle transmission.

FIGS. 4-6 are flowcharts illustrating particular embodiments of the operation of the rear external gear shift mechanism 9 using gear shift controller 15. The operation of the front external gear shift mechanism 8 is the same (except the front external gear shift mechanism 8 has only three sprockets), so the description of the operation of the front external gear shift mechanism 8 is omitted.

The installation of a battery in the gear shift controller 15 by the rider as a power supply enables gear shift control of the bicycle 1. When such installation is carried out, initialization is first executed with regard to the gear shift controller 15 in step S1 shown in FIG. 4. In this initialization, a variable OP is set to "1" and stored in the memory 22. OP is a gear value set via a shift command using the shift command unit 14b. OP is incremented or decremented in accordance with the operation of the shift command unit 14b. In addition, the gear shift mode is set to manual gear shift mode.

In step S2, it is determined whether or not the current gear shift mode is manual gear shift mode. Determining the content of the setting made via the mode switch 26, for example, makes this determination. In step S3, it is determined whether or not the current gear shift mode is automatic gear shift mode. In step S4, it is determined whether or not the gear shift controller is in some other mode so that other operations may be performed.

If it is determined in step S2 that the current gear shift mode is manual gear shift mode, then controller 23 advances from step S2 to step S5. In step S5, it is determined whether or not the rear upshift button 18b has been operated. In step S6, it is determined whether or not the rear downshift button 19b has been operated. If the rear upshift button 18b has been operated, the controller 23 advances from step S5 to step S7, and the upshift routine shown in FIG. 5 is executed. If the rear downshift button 19b has been operated, the controller 23 advances from step S6 to step S8, and the downshift routine shown in FIG. 6 is executed.

If it is determined in step S3 that the current gear shift mode is the automatic gear shift mode, the controller 23 advances from step S3 to step S9. In step S9, a bicycle speed V is calculated based on signals from the rotation speed sensor 10. In step S10, the currently set gear value OP is obtained. In step S11, it is determined whether or not the bicycle speed V is greater than an upshift threshold value U(OP) (stored in memory 22) for the current gear. In step S12, it is determined whether or not the bicycle speed V is lower than a downshift threshold value D(OP) for the current gear. If it is determined in step S11 that the bicycle speed V is higher than the upshift threshold value U(OP) for the current gear, then controller 23 advances from step S11 to step S13, and the upshift routine shown in FIG. 5 is executed. If it is determined in step S12 that the bicycle speed V is lower than the downshift threshold value D(OP) for the current gear, then the controller 23 advances from step S12 to step S14, and the downshift routine shown in FIG. 6 is executed.

If it is determined that other operations are to be performed, then the controller 23 advances from step S4 to step S15. In step S15, the selected other operations are executed, whereupon the controller 23 returns to step S2.

In this main routine, when the manual, automatic or other operation modes are selected, the operations associated with the selected mode are executed. If none of these modes are selected, then controller 23 returns to step S2 and repeats the main routine.

A particular embodiment of an upshift routine executed in steps S7 or S13 in FIG. 4 is shown in FIG. 5. In step S21, the current gear OP is incremented by one gear, and the resulting gear is set as the target gear. In step S22, it is determined whether or not the gear shift motor is operating in the direction of forward rotation (which may be determined by changes in value of the position data SH and monitored by the programming in controller 23). In other words, it is determined whether or not the rear derailleur 42 is undergoing a gear shift operation in the upshift direction. If the gear shift motor is not operating in the direction of forward rotation (i.e., if an upshift gear shift operation is not underway), then the controller 23 proceeds to step S23, wherein the gear shift motor is caused to operate in the direction of forward rotation and position data SH is obtained from the gear position sensor. If the gear shift motor is already operating in the direction of forward rotation, this operation is skipped.

In step S24, it is determined whether or not the position data SH indicates that the rear derailleur 42 has arrived at the set target gear and the gear shift operation can end. If it is determined that the gear shift operation can end, then the controller 23 proceeds to step S25, wherein the gear shift motor is turned OFF and the obtaining of the position data SH from the gear position sensor is ended. In this routine, a new target gear is first set in step S21 even when a gear shift operation is already underway. The new target gear replaces the previously set target gear.

A particular embodiment of a downshift routine executed in steps S8 or S14 in FIG. 4 is shown in FIG. 6. In this routine, the current gear OP is decremented by one gear, and the resulting gear is set as the target gear in step S31. In step S32, it is determined whether or not the gear shift motor is operating in the direction of reverse rotation. In other words, it is determined whether or not the rear derailleur 42 is undergoing a gear shift operation in the downshift direction.

If the gear shift motor is not operating in the direction of reverse rotation, (i.e., if a downshift gear shift operation is not underway), then the controller 23 proceeds to step S33, wherein the gear shift motor is made to operate in the direction of reverse rotation and position data SH is obtained from the gear position sensor. If the gear shift motor is already operating in the direction of reverse rotation, this operation is skipped.

In step S34, it is determined whether or not the position data SH indicates that the rear derailleur 42 has arrived at the set target gear and the gear shift operation can end. If it is determined that the gear shift operation can end, then the controller 23 proceeds to step S35, wherein the gear shift motor is turned OFF and the obtaining of the position data SH from the gear position sensor is ended. In this routine as well, as with the upshift routine, a new target gear is first set in step S31 even when a gear shift operation is already underway, the new target gear replaces the previously set target gear.

Where the gear shift mode is manual gear shift mode, the rider can shift to a desired gear by pressing the upshift buttons 18a or 18b or the downshift buttons 19a or 19b of the shift command units 14a and 14b at the desired timing. In automatic gear shift mode, the gear shift operation is performed automatically based on the bicycle speed V. During manual gear shift mode, if the shift command unit 14a is operated while the front external gear shift mechanism 8 is undergoing a gear shift operation or if the shift command unit 14b is operated while the rear external gear shift mechanism 9 is undergoing a gear shift operation, or if the bicycle speed V is higher than the upshift threshold value for the current active gear or is lower than the downshift threshold value for that gear, the target gear OP is incremented or decremented accordingly and a new target gear is set.

For example, if an upshift button 18a or 18b is pressed, or if the bicycle speed exceeds the upshift threshold value for the current gear, the value of OP in the memory 22 is increased by 1, and conversely, if a downshift button 19a or 19b is pressed, or if the bicycle speed is lower than the downshift threshold value for the current gear, the value of OP in the memory 22 is decreased by 1. If multiple shift commands are issued using the shift command units 14a or 14b, the value of OP is increased or decreased via addition or subtraction in accordance with the multiple actions carried out using the shift command units 14a or 14b. This addition/subtraction operation is carried out regardless of whether a gear shift operation is already underway, and the target gear value is updated based on the newly output gear shift signals. As a result, even where gear shift signals are output or generated while a gear shift operation is underway, the gear shift operation is always carried out for the most current target gear. This carries out the intent of the rider and enhances smoothness in the gear shift operation.

Figure 7A:
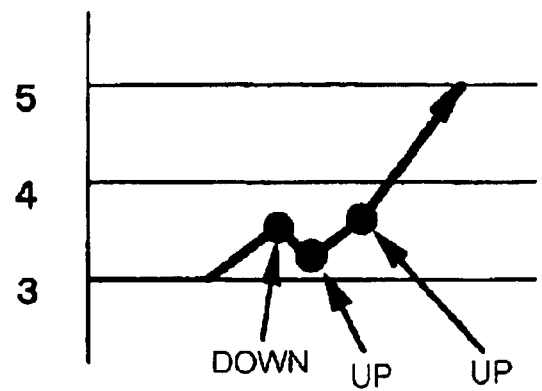
FIGS. 7(A)-7(C) are graphs showing the effects of the described embodiment compared to the prior art.
Figure 7B:
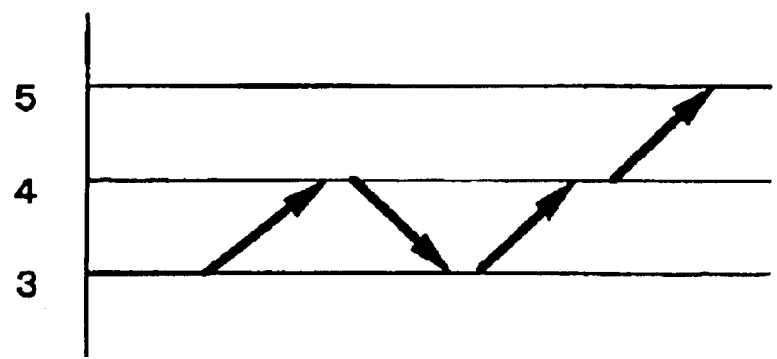
Figure 7C:
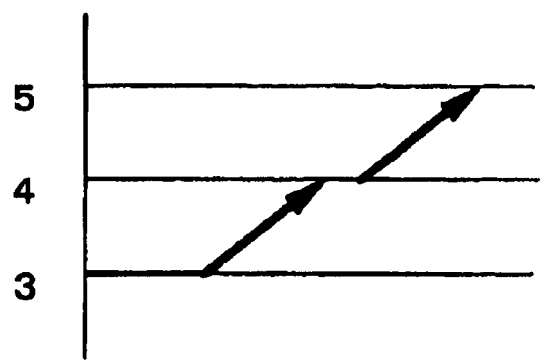

FIGS. 7(A)-7(C) illustrate a situation where the rider presses the rear upshift button 18b twice after pressing the rear downshift button 19b once while a gear shift operation to shift from third gear to fourth gear is underway. In this embodiment, the target gear is updated when needed, and gear shifting to the final destination gear is carried out even while an existing gear shift operation is underway as shown in FIG. 7(A). In other words, the gear shifting motor rotates forward or backward by a precise amount while the gear shifting operation is underway, and the gear is shifted to the final destination gear via a single gear shift operation (effectively canceling the intermediate gear shift commands). As a result, needless gear shift operations can be eliminated, and the gear shifting to the final destination gear can be carried out smoothly and quickly without ignoring shift commands. Furthermore, where the front derailleur 33 and the rear derailleur 42 are battery-driven, the elimination of needless gear shift operations helps to prevent wasteful battery consumption.

The actions of prior art systems that perform sequential gear shift operations for each shift command are shown in FIG. 7(B). In such systems, after the gear shift operation from third gear to fourth gear is completed, a gear shift operation from fourth gear to third gear is executed, and then gear shift operations to shift from third to fourth gear and from fourth gear to fifth gear are executed. This results in a total of four gear shift operations. However, the rider's shift commands were based on a desire to shift only one gear (from fourth gear into fifth gear). In other words, the operations to switch from fourth gear to third gear and then from third gear back into fourth gear are unnecessary.

In another prior art method shown in FIG. 7(C), shift commands are combined such that gear shifts are performed one at a time, with each gear shift being executed after the previous gear shift has completed. In this method, the gear is shifted from third gear into fourth gear, and then from fourth gear into fifth gear, thus resulting in a total of two separate and distinct gear shift operations. Unfortunately, such separate and distinct gear shift operations may result in jerkiness between the two gear shift operations, and the smoothness of the transition between the gears may be lost.

Figure 8:
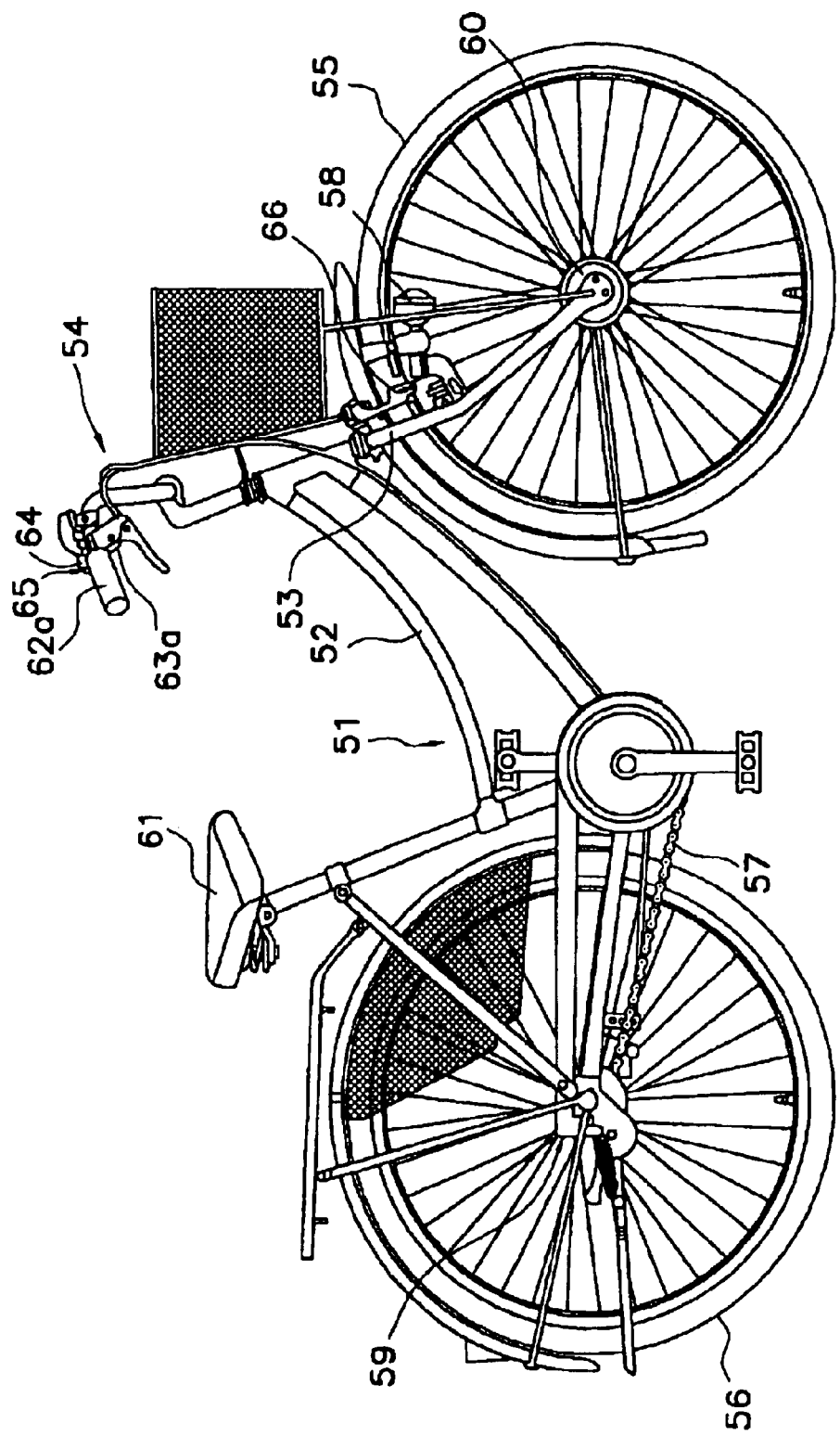
FIG. 8 is a side view of a bicycle that includes a second embodiment of an electrically controlled bicycle transmission.

In the first embodiment, downshift and upshift signals were output directly from the shift command units 14a and 14b in manual gear shift mode, but it is also acceptable if the gear shift command units have buttons corresponding to each gear, and downshift and upshift signals are generated based on a comparison between the gear selected by a given button and the current gear. FIG. 8 is a side view of such a bicycle that includes a second embodiment of an electrically controlled bicycle transmission. As shown in FIG. 8, the bicycle 51 is an ordinary recreational bicycle, and it includes as its main components a frame 52, a fork 53 rotatably mounted to the front of frame 52, a handlebar assembly 54 mounted to the upper portion of fork 53, a front wheel 55 rotatably mounted to the lower portion of fork 53, a rear wheel 56 rotatably mounted to the rear of frame 52, and a saddle 61 on which the rider sits disposed at the top center part of the frame 52.

The front wheel 55 includes a generator hub 60 that forms the hub of front wheel 55 and is mounted at the bottom of the front fork 53. The generator hub 60 serves both as a power supply for a front lamp 58 mounted to the front fork 53 and may function as a speed sensor that detects the speed of the bicycle. A front wheel brake 66 that performs braking of the front wheel 55 is disposed at the top of fork 53. A chain 57 is suspended over a front sprocket (shown schematically) and over a rear sprocket (not shown) disposed on the internal gear shift hub 59. Chain 57 transmits the drive power from one of the front sprocket to the rear sprocket. The internal gear shift hub 59 forms the hub part of the rear wheel 6 and transmits the drive power from the chain 57 to the rear wheel 56. The internal gear shift hub 59 can change among three gears via a gear shift unit such as a gear shift motor (not shown). Furthermore, the internal gear shift hub 59 can detect the position of the current gear based on position data SH from a gear position sensor (not shown).

Grips 62a and 62b (only 62a is shown) and brake levers 63a and 63b (only 63a is shown) are located at either end of the handlebar 54, much like in the first embodiment. Furthermore, a gear shift control apparatus 65 having a shift command unit 64 is mounted to the handlebar 4 inboard of the grip 62a and the brake lever 63a. First-gear through third-gear gear shift buttons 67–69 (FIG. 9) corresponding to first through third gears of the internal gear shift hub 59 are disposed on the shift command unit 64.

Figure 9:
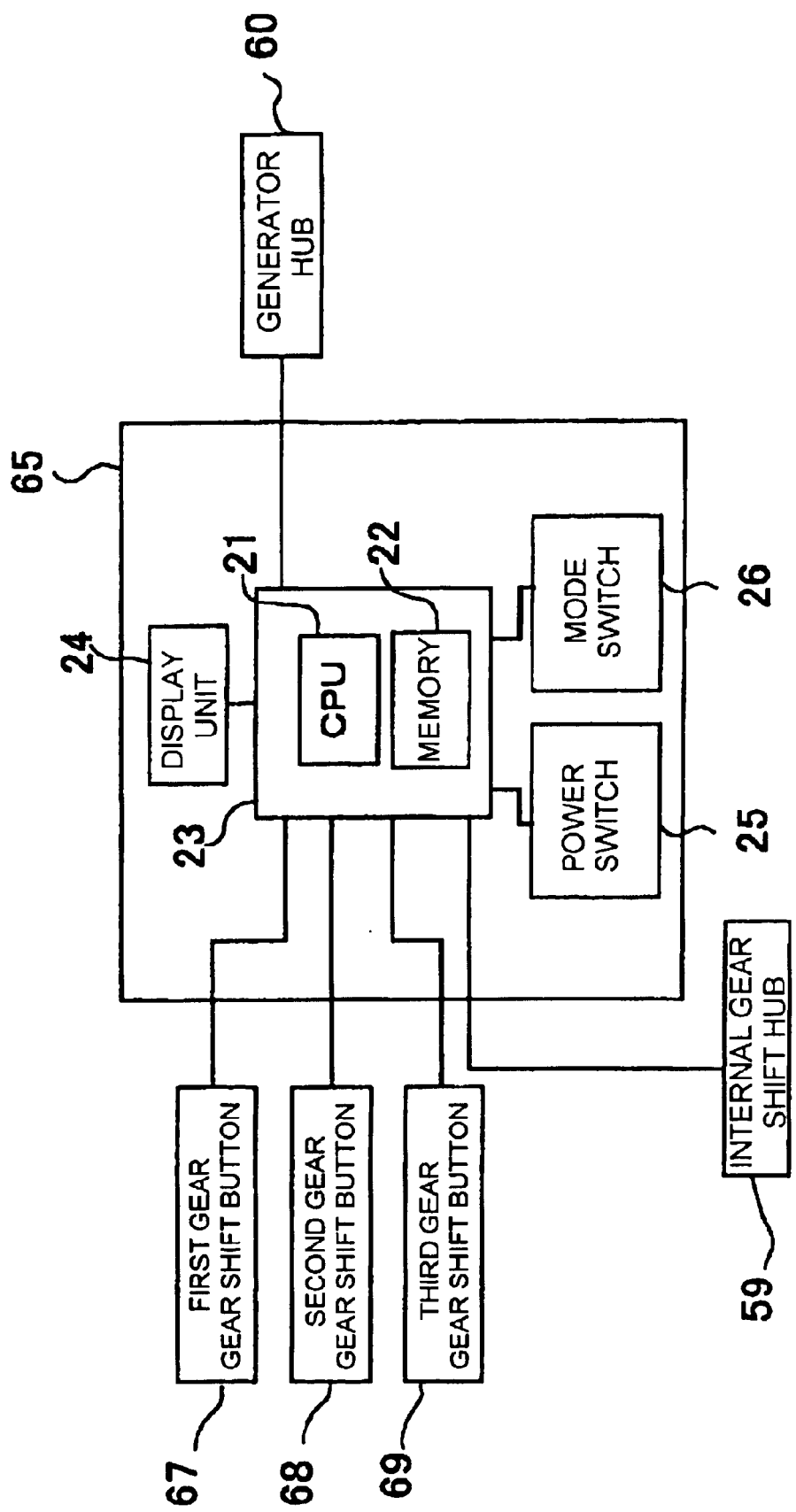
FIG. 9 is a block diagram of a particular embodiment of electrical components used with the second embodiment shown in FIG. 8.

As shown in FIG. 9, the gear shift control apparatus 65 includes a controller 23 comprising a CPU 21 and a memory 22, a display unit 24 that displays the current active gear and other information, a power switch 25 and a mode switch 26. The controller 23 performs gear shift control and display control via the CPU 21. First-gear through third-gear gear shift buttons 67–69 are connected to the controller 23, as well as generator hub 60 and internal gear shift hub 59. The display unit 24 comprises a liquid crystal display device that uses the segment method, for example, and can display the current bicycle speed, the total distance traveled the current gear, and so on. The power switch 25 turns the display unit 24 ON and OFF, and the mode switch 26 changes the mode of the gear shift control apparatus 65 between automatic gear shift mode and manual gear shift mode.

Figure 10:
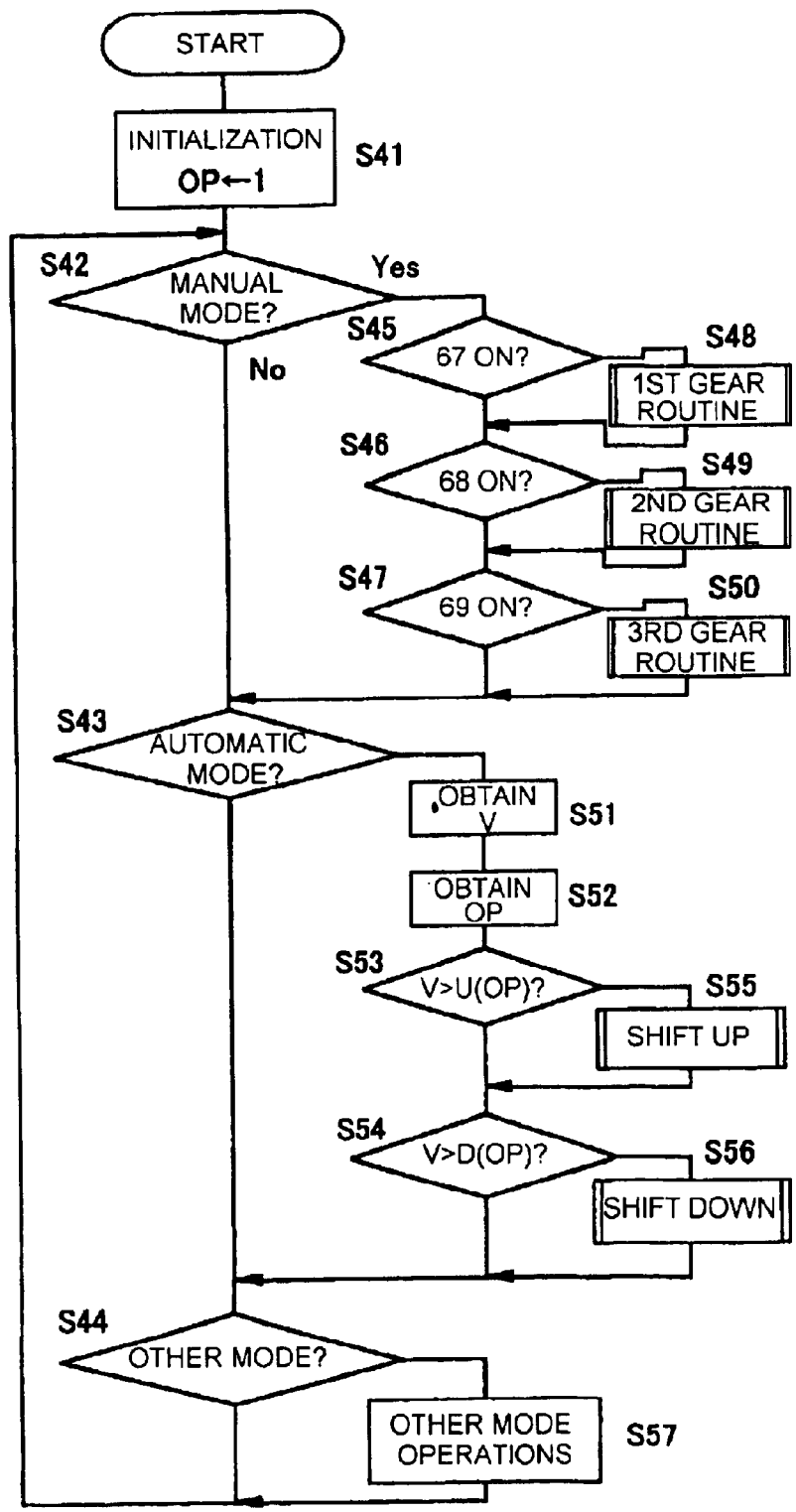
FIG. 10 is a flow chart of a particular embodiment of a routine used to control the bicycle transmission in the second embodiment.
Figure 11:
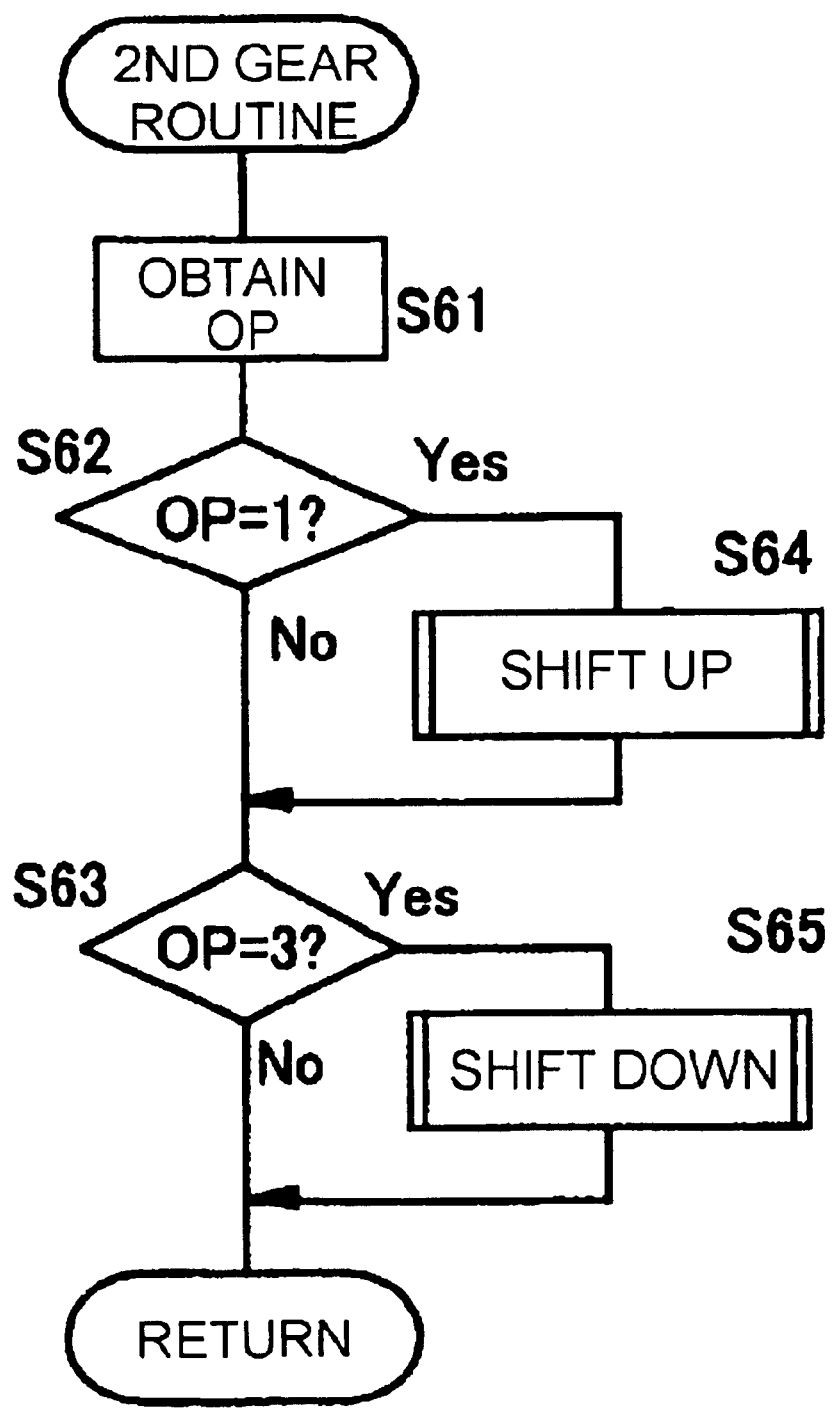
FIG. 11 is a flow chart of a particular embodiment of a second gear routine used to control the bicycle transmission in the second embodiment.

In manual gear shift mode, the shift command unit 64 performs gear shifting with respect to the internal gear shift hub 59 using gear shift buttons 67-69. In automatic gear shift mode, gear shift signals are generated in accordance with speed signals from the generator hub 60. FIGS. 10 and 11 are flowcharts illustrating the operation of this embodiment. Control operations identical to those executed in connection with the first embodiment will not be described. Gear shift control of the bicycle 51 is enabled when the rider installs a battery in the gear shift control apparatus 65 as a power supply, or when electric power is supplied from the generator hub 60. When such installation or power supply occurs, first, the operations of steps S41 through S44 shown in FIG. 10 are performed in the same fashion as steps S1 through S4 shown in FIG. 4.

If it is determined in step S42 that the gear shift mode is manual gear shift mode, then the controller 23 advances from step S42 to step S45. In step S45, it is determined whether or not the first-gear gear shift button 67 has been pressed. In step S46, it is determined whether or not the second-gear gear shift button 68 has been pressed. In step S47, it is determined whether or not the third-gear gear shift button 68 has been pressed. If the first-gear gear shift button 67 has been pressed, the controller 23 advances from step S45 to step S48, and the first-gear routine is executed. If the second-gear gear shift button 68 has been pressed, the controller 23 advances from step S46 to step S49, and the second-gear routine is executed. If the third-gear gear shift button 69 has been pressed, the controller 23 advances from step S47 to step S50, and the third-gear routine is executed.

If it is determined that the gear shift mode is automatic gear shift mode, then the controller 23 advances from step S43 to step S51, and the same operations that were executed in connection with the first embodiment are executed up to step S56. If it is determined that other operations are to be executed, then the controller 23 advances from step S44 to step S57, the selected operations are executed, and the controller 23 advances to step S42.

In the second-gear routine shown in FIG. 11, the current gear OP is read in a step S61. In step S62, it is determined whether or not the current gear OP is first gear (low gear). In step S63, it is determined whether or not the gear OP is third gear (high gear). If the current gear OP is first gear (low gear), then the controller 23 advances from step S62 to step S64, and the shift-up routine shown in FIG. 5 is executed. If the current gear OP is third gear (high gear), the controller 23 advances from step S63 to step S65, and the shift-down routine shown in FIG. 6 is executed. In the second-gear routine, gear shift control is performed when the current gear is not second gear (middle gear). Therefore, in the case of the first-gear routine, the downshift routine may be executed where the current gear is not first gear, and in the case of the third-gear routine, the upshift routine may be executed where the current gear is not third gear. Furthermore, when the third-gear routine is executed from first gear or the first-gear routine is executed from third gear, then two shift-up or shift-down routines may be executed.

Figure 12:
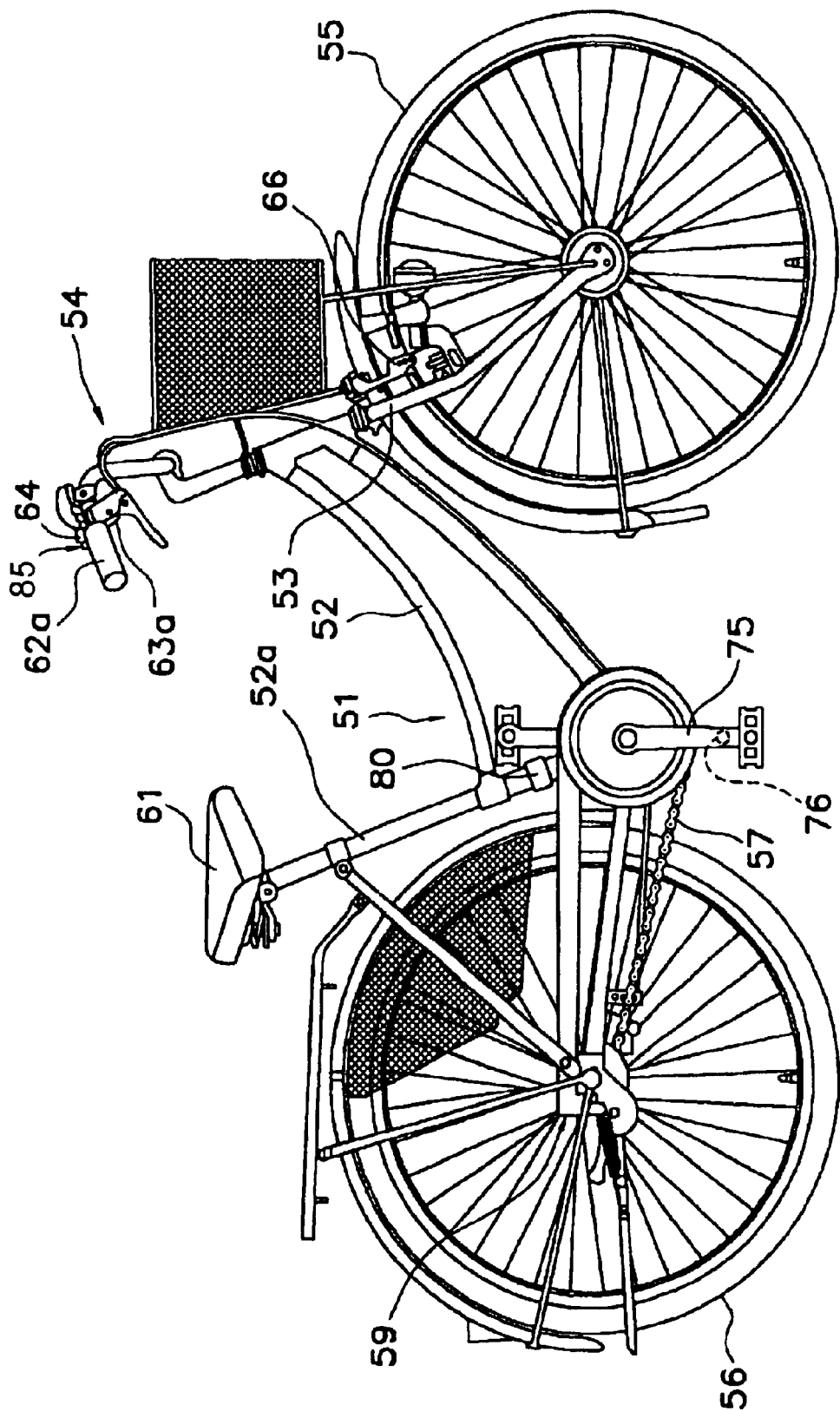
FIG. 12 is a side view of a bicycle that includes a third embodiment of an electrically controlled bicycle transmission.

In the two embodiments described above, gear shifting was based on the bicycle speed in automatic gear shift mode, but it may also be based on the crank rotation speed. This allows the rider to maintain cadence in a desired range. FIG. 12 shows such an embodiment. As shown in FIG. 12, the bicycle 51 is an ordinary recreational bicycle identical to that described in connection with the second embodiment, and it includes a frame 52, a front fork 53, a handlebar 54, a front wheel 55, a rear wheel 56, a chain 57, and an internal gear shift hub 59 having three gears. A detailed description of the construction will be omitted.

A magnet 76 that functions as a detection element for detecting the rotation of a crank 75 that is rotatably mounted to the bottom center area of frame 52. In addition, a crank rotation sensor 80 that detects the number of crank rotations based on detection of the magnet 76 is fixed to the seat tube 52a of the frame 52. The gear shift controller 85 controls the operation of the internal gear shift hub 59 based on gear shift signals generated in response to the operation of the shift command unit 64 in manual gear shift mode, and based on gear shift signals generated in accordance with crank rotation signals from the crank rotation sensor 80 in automatic gear shift mode.

Figure 13:
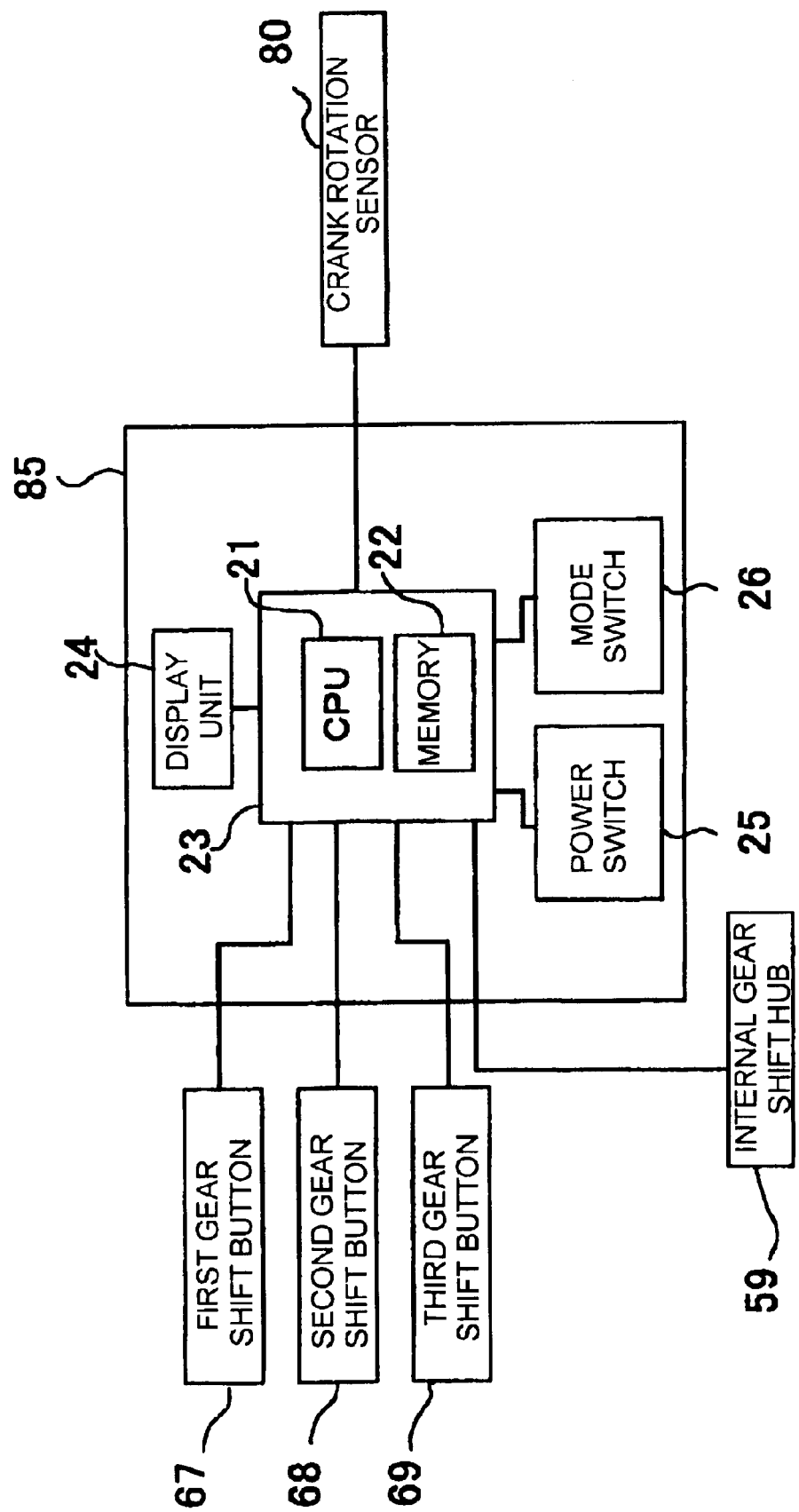
FIG. 13 is a block diagram of a particular embodiment of electrical components used with the third embodiment shown in FIG. 12.

As shown in FIG. 13, the gear shift control apparatus 85 includes a controller 23 comprising a CPU 21 and a memory 22, a display unit 24 that displays the current active gear and other information, a power switch 25 and a mode switch 26. The controller 23 performs gear shift control and display control via the CPU 21. First-gear through third-gear gear shift buttons 67–69 and the crank rotation sensor 80 are connected to the controller 23. The display unit 24 comprises a liquid crystal display device that uses the segment method, for example, and can display the current bicycle speed, the total distance traveled, the current gear, and so on. The power switch 25 turns the display unit 24 ON and OFF, and the mode switch 26 changes the mode of the shift controller 85 between automatic gear shift mode and manual gear shift mode. The shift controller 85 is connected to the internal gear shift hub 59.

Figure 14:
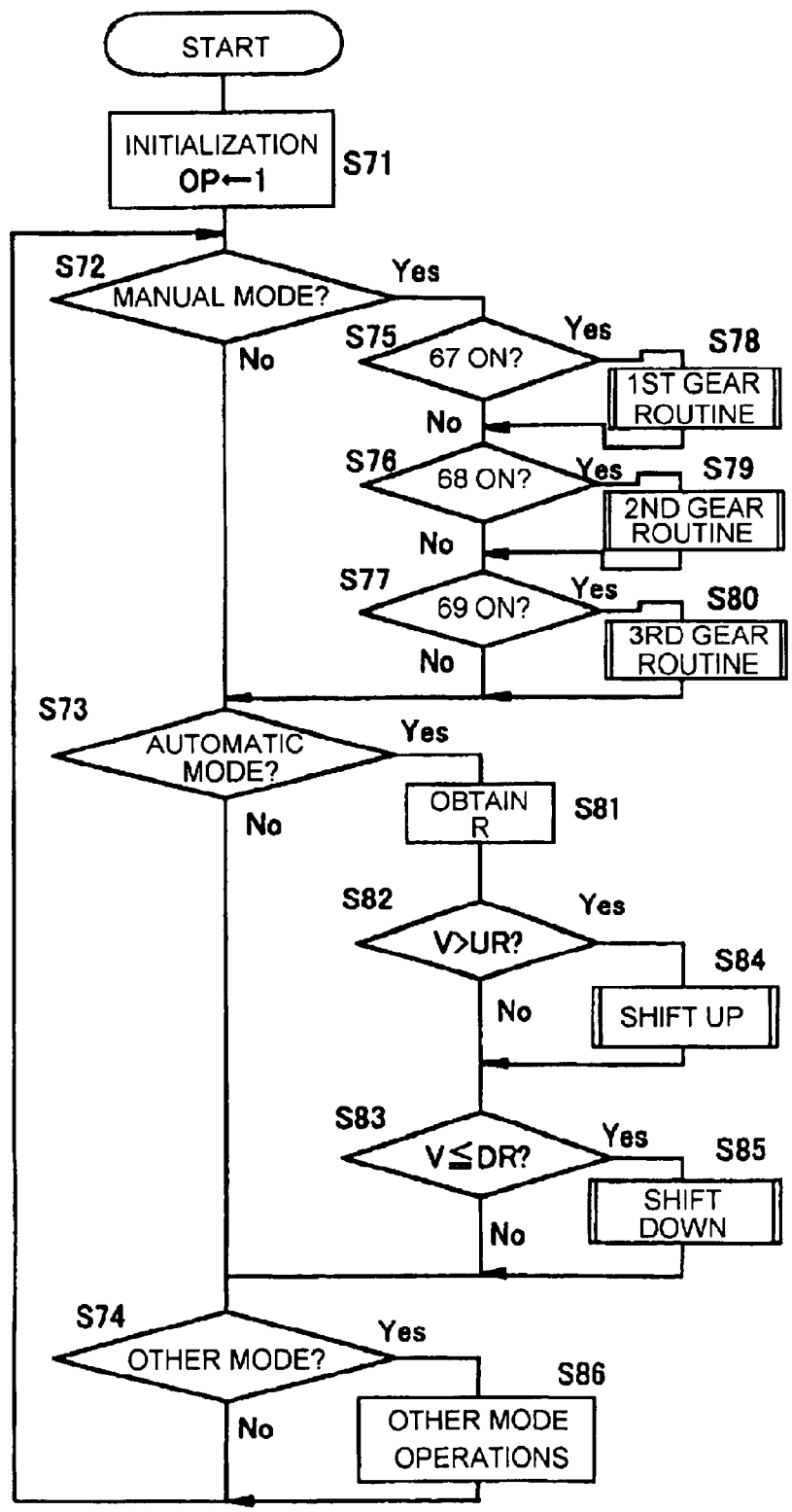
FIG. 14 is a flow chart of a particular embodiment of a routine used to control the bicycle transmission in the third embodiment.

FIG. 14 is a flow chart illustrating the operation of this embodiment. Control operations identical to those executed in connection with the second embodiment will not be described.

Gear shift control of the bicycle 1 is enabled when the rider installs a battery in the shift controller 85 as a power supply. When such installation occurs, first, the operations of steps S71 through S80 shown in FIG. 14 are performed in the same fashion as steps S41 through S50 shown in FIG. 10.

If it is determined that the gear shift mode is automatic gear shift mode, the controller 23 advances from step S73 to step S81, and the crank rotation speed R is obtained. In step S82, it is determined whether or not the obtained crank rotation speed R exceeds the upshift threshold value (for example, 65 rpm, stored in memory 22). In step S83, it is determined whether or not the obtained crank rotation speed R is lower than the downshift threshold value DR (for example, 40 rpm). In this third embodiment, the crank rotation rate threshold values are fixed regardless of the gear, but it is acceptable if the threshold values vary depending on the gear. If it is determined that the obtained crank rotation speed R exceeds the shift-up threshold value, then the controller 23 advances from step S82 to step S84, and the upshift routine shown in FIG. 5 is executed. Similarly, if it is determined that the obtained crank rotation speed R is lower than the shift-down threshold value, then the controller 23 advances from step S83 to step S85, and the downshift routine shown in FIG. 6 is executed. If it is determined that other operations are to be executed, then the controller 23 advances from step S74 to step S86, and the selected other operations are executed. The controller 23 then returns to step S72.

While the above is a description of various embodiments of inventive features, further modifications may be employed without departing from the spirit and scope of the present invention. For example, in the above embodiments, automatic gear shifting was carried out via electric power, but the foregoing inventive features can be implemented using pneumatic driving or some other type of drive power. Furthermore, the gear shifting action was carried out by pressing a button in manual gear shift mode, but the action can also be carried out by operating a lever-type switch or other type of switch.

In the above embodiments, inventive features were described using the example of a gear shift control apparatus having both a manual gear shift mode and an automatic gear shift mode, but inventive features may exist where the gear shift control apparatus has only one of such modes.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle gear shift control apparatus for controlling a gear shift unit that shifts a bicycle transmission among a plurality of gears, wherein the gear shift control apparatus comprises:

a shift command input that receives shift commands indicating a desired gear shift operation;

a control output that outputs control signals that control the gear shift unit to shift the bicycle transmission;

a gear shift monitor that monitors a progress of a gear shift operation by the gear shift unit;

a gear shift controller operatively coupled to the shift command input, to the control output, and to the gear shift monitor, wherein the gear shift controller receives a shift command and outputs a control signal that controls the operation of the gear shift unit to shift the bicycle transmission to a target gear; and wherein the gear shift controller modifies the control signal when the gear shift controller receives a second shift command corresponding to a second target gear that differs from a first target gear corresponding to a first shift command and the gear shift operation initiated by the first shift command has not completed.

2. The apparatus according to claim 1 wherein the shift commands comprise:

an upshift command that causes the gear shift controller to output a control signal to upshift the bicycle transmission by one gear; and a downshift command that causes the gear shift controller to output a control signal to downshift the bicycle transmission by one gear.

3. The apparatus according to claim 1 wherein the shift command includes a multiple-gear shift command that corresponds to multiple gears of bicycle transmission.

4. The apparatus according to claim 1 further comprising a manual gear shift command unit for providing a shift command generated by a manual operation of a user.

5. The apparatus according to claim 4 wherein the manual gear shift command unit comprises:

a manually operated upshift command member; and a manually operated downshift command member.

6. The apparatus according to claim 4 wherein the manual gear shift command unit comprises a plurality of manually operated direct gear shift command members, each manually operated direct gear shift command member corresponding to one of the plurality of gears of the bicycle transmission.

7. The apparatus according to claim 1 further comprising a rotation speed detector operatively coupled to the gear shift controller, wherein the rotation speed detector detects a rotation speed of a rotating member of the bicycle and provides a rotation speed signal to the gear shift controller, and wherein the gear shift controller provides a control signal that controls the gear shift unit in response to the rotation speed signal.

8. The apparatus according to claim 7 wherein the rotation speed detector detects a rotation speed of a wheel of the bicycle.

9. The apparatus according to claim 7 wherein the rotation speed detector detects a rotation speed of a hub of the bicycle.

10. The apparatus according to claim 7 wherein the rotation speed detector detects a rotation speed of a crank of the bicycle.

* * * * *